(12) United States Patent
Khanna

(10) Patent No.: US 10,306,428 B1
(45) Date of Patent: May 28, 2019

(54) SYSTEM AND METHOD OF USING TRAINING DATA TO IDENTIFY VEHICLE OPERATIONS

(71) Applicant: HONDA MOTOR CO., LTD., Minato-ku, Tokyo (JP)

(72) Inventor: Rahul Khanna, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 15 days.

(21) Appl. No.: 15/861,305

(22) Filed: Jan. 3, 2018

(51) Int. Cl.
 *G07C 5/08* (2006.01)
 *H04W 4/38* (2018.01)
 *H04W 4/46* (2018.01)

(52) U.S. Cl.
 CPC ............ *H04W 4/38* (2018.02); *G07C 5/0816* (2013.01); *H04W 4/46* (2018.02); *G07C 5/0808* (2013.01)

(58) Field of Classification Search
 None
 See application file for complete search history.

(56) References Cited

U.S. PATENT DOCUMENTS

| 6,629,029 | B1 | 9/2003 | Giles | |
|---|---|---|---|---|
| 9,681,111 | B1 | 6/2017 | Newman | |
| 2011/0260884 | A1* | 10/2011 | Yi | G07C 5/008 340/870.02 |
| 2013/0201316 | A1 | 8/2013 | Binder et al. | |
| 2014/0109075 | A1* | 4/2014 | Hoffman | G06F 8/65 717/169 |
| 2014/0195108 | A1 | 7/2014 | Schumacher | |
| 2014/0223284 | A1 | 8/2014 | Rankin, Jr. et al. | |
| 2015/0102900 | A1 | 4/2015 | Ramchandani et al. | |
| 2015/0254719 | A1 | 9/2015 | Barfield, Jr. et al. | |
| 2016/0003621 | A1 | 1/2016 | Koenig et al. | |
| 2016/0084657 | A1 | 3/2016 | Schilling et al. | |

(Continued)

FOREIGN PATENT DOCUMENTS

| KR | 20150138578 A | 12/2015 | |
|---|---|---|---|
| WO | WO-2016037193 A1 * | 3/2016 | ............ G07C 5/006 |
| WO | WO 2016/206765 A1 | 12/2016 | |

OTHER PUBLICATIONS

"MyDriving IoT System: Quick Start", Mar. 25, 2016.
K Solution LLC "Engine Link—OBD II Vehicle Monitoring & Diagnosis", pp. 1-8, as viewed on Jun. 19, 2017.

*Primary Examiner* — Thomas G Black
*Assistant Examiner* — Demetra R Smith-Stewart
(74) *Attorney, Agent, or Firm* — Arent Fox LLP

(57) ABSTRACT

A method for identifying a type of a sensor includes obtaining a first input data stream from the unidentified sensor in a vehicle, wherein the input data stream includes an identifier representing the unidentified sensor and a first data pattern associated with the identifier, detecting a change in a vehicle parameter of the vehicle, obtaining a second input data stream from the unidentified sensor in the vehicle, wherein the second input data stream includes the identifier and a second data pattern associated with the identifier, the second data pattern being different from the first data pattern, associating the change in the vehicle parameter of the vehicle with a change from the first data pattern to the second data pattern, and identifying the type associated with the unidentified sensor based on detecting the change in the vehicle parameter.

20 Claims, 5 Drawing Sheets

(56) References Cited

U.S. PATENT DOCUMENTS

| | | | |
|---|---|---|---|
| 2016/0253849 A1* | 9/2016 | Kwak | G07C 5/008 |
| | | | 701/31.5 |
| 2016/0349330 A1 | 12/2016 | Barfield, Jr. et al. | |
| 2016/0365114 A1 | 12/2016 | Galant et al. | |
| 2017/0011561 A1 | 1/2017 | Makke et al. | |
| 2017/0262301 A1* | 9/2017 | Bai | G06F 9/4411 |
| 2017/0309092 A1* | 10/2017 | Rosenbaum | G07C 5/008 |
| 2017/0337573 A1* | 11/2017 | Toprak | G06Q 30/0206 |
| 2018/0096542 A1* | 4/2018 | Mader | G07C 5/085 |

\* cited by examiner

SYSTEM AND METHOD OF USING TRAINING DATA TO IDENTIFY VEHICLE OPERATIONS

BACKGROUND

Automotive vehicles perform numerous operations when driven by a driver. During the process of operating a vehicle, the driver may accelerate, brake, activate headlights, turn, etc. These operations may be monitored by sensors dispersed throughout the vehicle. For example, sensors around the engine of the vehicle may monitor the air flow through the engine, the rotational speed of the crankshaft, the amount of oxygen exiting the engine, and the temperature of the fuel. The sensors may provide feedback signals to a computing device controlling the engine, thus ensuring optimal performance.

A technician or engineer servicing the vehicle may download information collected by the sensors via wired or wireless connections. The sensor information may assist the technician or engineer with diagnostic analysis, design improvements, and/or data mining. The sensors may connect to a network internal to the vehicle to transmit information among the sensors and other components connected to the network. Each sensor may include a unique identification.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the disclosure include a method for identifying a type of an unidentified sensor including obtaining a first input data stream from the unidentified sensor in a vehicle, wherein the input data stream includes an identifier representing the unidentified sensor and a first data pattern associated with the identifier, detecting a change in a vehicle parameter of the vehicle, obtaining a second input data stream from the unidentified sensor in the vehicle, wherein the second input data stream includes the identifier and a second data pattern associated with the identifier, the second data pattern being different from the first data pattern, associating the change in the vehicle parameter of the vehicle with a change from the first data pattern to the second data pattern, and identifying the type associated with the unidentified sensor based on detecting the change in the vehicle parameter.

Aspects of the disclosure include a dongle having a memory, an interface, and one or more processors configured to obtain a first input data stream from the unidentified sensor in a vehicle through the interface, wherein the input data stream includes an identifier representing the unidentified sensor and a first data pattern associated with the identifier, detect a change in a vehicle parameter of the vehicle, obtain a second input data stream from the unidentified sensor in the vehicle through the interface, wherein the second input data stream includes the identifier and a second data pattern associated with the identifier, the second data pattern being different from the first data pattern, associate the change in the vehicle parameter of the vehicle with a change from the first data pattern to the second data pattern, and identify the type associated with the unidentified sensor based on detecting the change in the vehicle parameter.

Aspects of the disclosure includes a non-transitory computer readable medium having instructions stored therein that, when executed by one or more processors, cause the one or more processors to obtain a first input data stream from the unidentified sensor in a vehicle, wherein the input data stream includes an identifier representing the unidentified sensor and a first data pattern associated with the identifier, detect a change in a vehicle parameter of the vehicle, obtain a second input data stream from the unidentified sensor in the vehicle, wherein the second input data stream includes the identifier and a second data pattern associated with the identifier, the second data pattern being different from the first data pattern, associate the change in the vehicle parameter of the vehicle with a change from the first data pattern to the second data pattern, and identify the type associated with the unidentified sensor based on detecting the change in the vehicle parameter.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
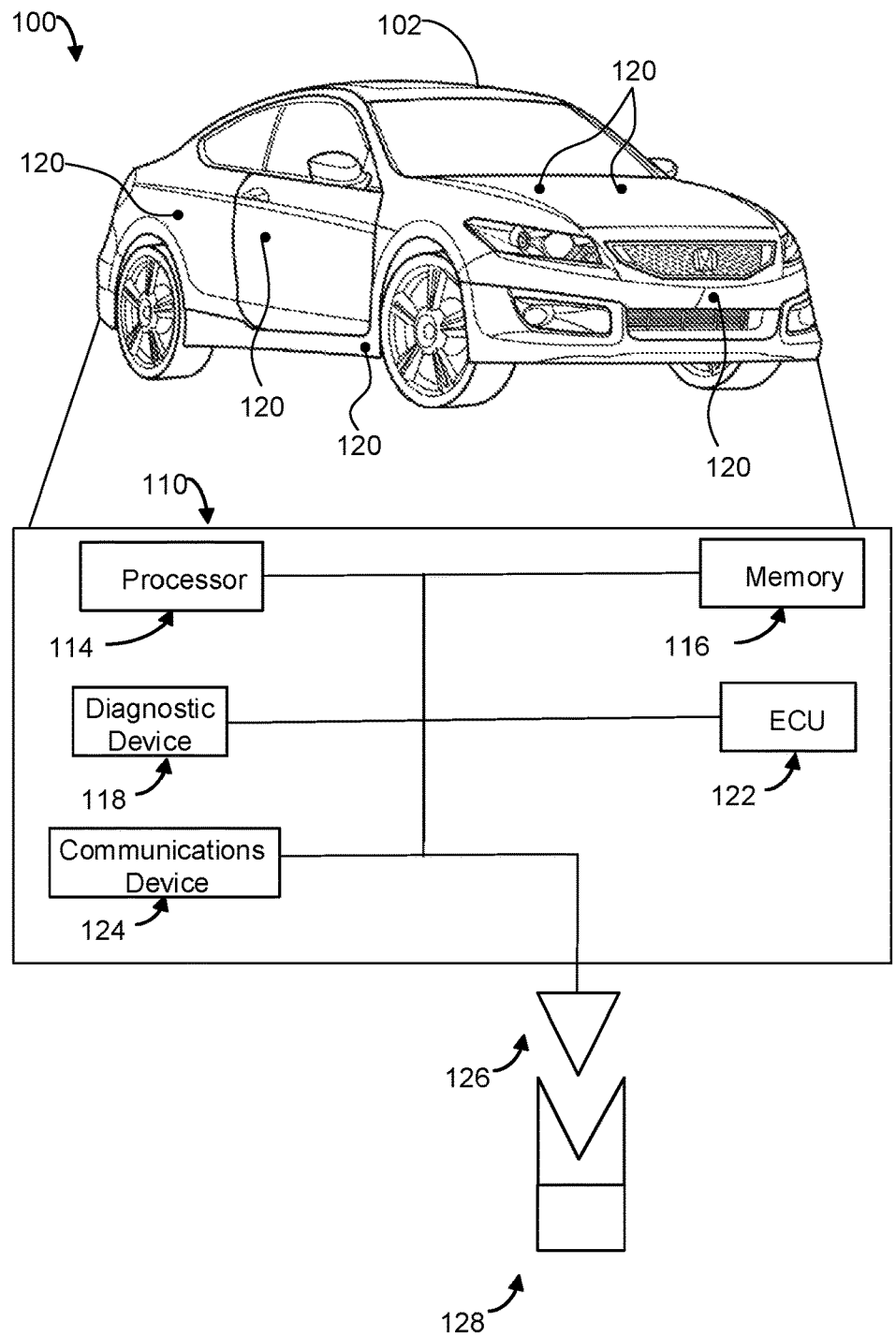
FIG. 1 illustrates a schematic view of an example operating environment of an automotive electronic system in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected," is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, ATVs, boats, personal watercraft, and aircraft. In some cases, a motor vehicle includes one or more engines.

In some implementations, a vehicle may include a number of unidentified sensors interconnected via a controller area network (CAN). Each unidentified sensor connected to the CAN has a unique identification (ID). A driver, however, may not be able to associate each unique ID with each unidentified sensor. An aspect of the present disclosure is for an external device to identify unidentified sensors connected to the CAN of the vehicle. First, the external device obtains a first input data stream from the CAN. The first input data stream includes a unique ID representing an unidentified sensor, and a first data pattern. When a change in a vehicle parameter (e.g., activating the high beams of the vehicle) is induced, the external device obtains a second input data stream from the CAN. The second input data stream includes the same unique ID and a second data pattern. Based on detecting the activation in the high beams, and the change from the first data stream to the second data stream, the external device can identify the type of sensor associated with the identifier, namely a light sensor.

Turning to FIG. 1, a schematic view of an example operating environment 100 of an automotive electronics system 110 according to an aspect of the disclosure is provided. The automotive electronics system 110 may reside within a vehicle 102. The components of the automotive electronics system 110, as well as the components of other systems, hardware architectures, and software architectures discussed herein, may be combined, omitted or organized into various implementations.

The vehicle 102 may generally include an electronic control unit (ECU) 122 that operably controls a plurality of vehicle systems. The vehicle systems may include, but are not limited to, the automotive electronics system 110, among others, including vehicle HVAC systems, vehicle audio systems, vehicle video systems, vehicle infotainment systems, vehicle telephone systems, vehicle control systems, and the like.

The vehicle 102 may further include a communications device 124 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 124 of the vehicle 102 may be operably connected for internal computer communication via a bus (e.g., a CAN or a LIN protocol bus) to facilitate data input and output between the electronic control unit 122 and vehicle features and systems. In an aspect, the communications device 124 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

In some implementations, the automotive electronics system 110 may include a diagnostic device 118 and one or more sensors 120. The diagnostic device 118 may obtain information from the sensors 120. The sensors 120 may be disposed throughout the vehicle 102, and collect information such as fuel quantity, fuel range, speedometer reading, odometer reading, engine rotation per minute reading, brake pressure reading, turn signal status, door locks status, steering angle, wheel speed, passenger presence, headlight status, cruise control status, engine oil life, engine oil quantity, vehicle identification number, trip distance, wiper status, parking brake status, ignition status, horn application, presence of rain, transmission torque reading, engine coolant temperature reading, average fuel economy, gear position, global positioning system (GPS) data, entertainment system data, tire pressure reading, battery reading, and other information relevant to the operation of the vehicle 102.

In some implementations, the automotive electronics system 110 may include a diagnostic port 126 connected to the CAN within in vehicle 100. An external device 128 may connect to the diagnostic port 126 and download sensor information from the sensors 120. The external device 128 may be a dongle, a Universal Serial Bus device, or any suitable device that interfaces with the diagnostic port 126.

Figure 2:
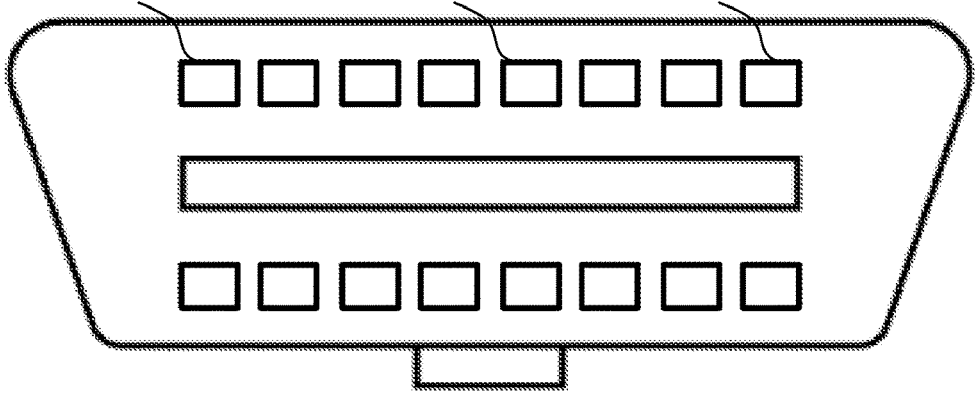
FIG. 2 illustrates a schematic view of example interfaces of the diagnostic port and the external device.
Figure 2:
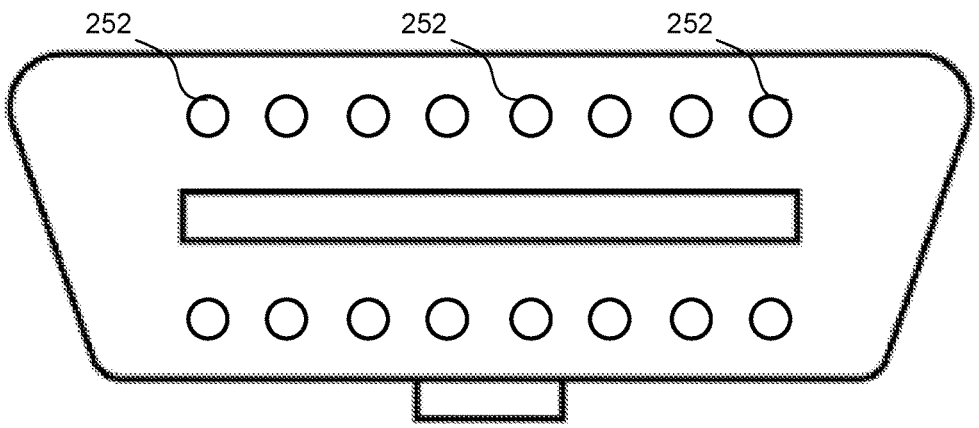

Turning now to FIG. 2, a schematic view of an interface 200 of the diagnostic port 126 and an interface 250 of the external device 128 is provided. In some implementations, the interface 200 may include a number of holes 202 and the interface 250 may include a number of pins 252. When the interfaces 200, 250 are connected, the pins 252 are physically inserted into the corresponding holes 202, forming a number of electrical connections between the diagnostic port 126 and the external device 128. Once the interfaces 200, 250 are connected, electrical signals may be exchanged between the diagnostic port 126 and the external device 128. The interfaces 200, 250 may be compatible with On-Board Diagnostic (OBD) interfaces, OBD-II interfaces, Universal Serial Bus interfaces, Parallel interfaces, Serial interfaces, or other standard or non-standard industry interfaces.

Figure 3:
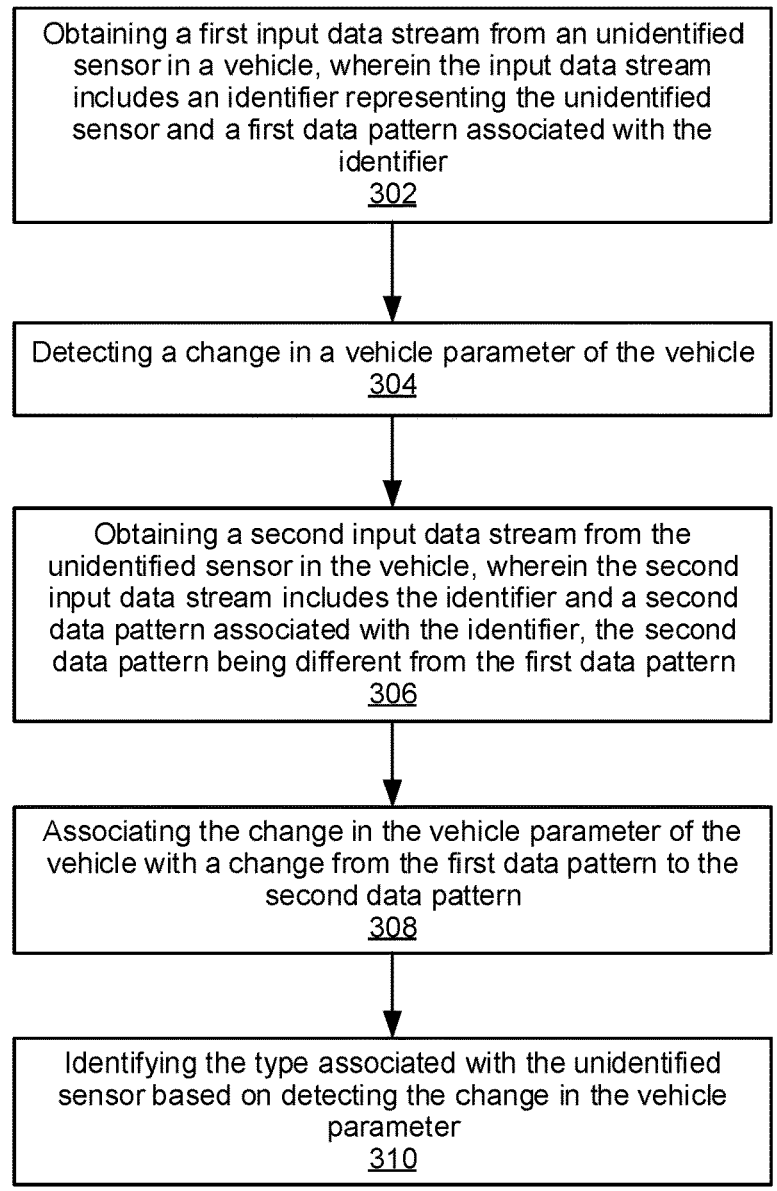
FIG. 3 illustrates a flow chart of an aspect of the present disclosure.

Turning now to FIG. 3, in some implementations, the external device 128 may obtain (302) a first input data stream from an unidentified sensor in a vehicle. The input data stream includes an identifier representing the unidentified sensor and a first data pattern associated with the identifier. For example, the external device 128 may obtain (302) a data stream including an 8-bit identifier of 10101111 and a 16-bit data pattern of 1111000011110000 associated with the unidentified sensor.

Next, in some implementations, the external device 128 may detect (304) a change in a vehicle parameter. For example, external device 128 may receive an input from a driver of the vehicle indicating the activation of high beams. Alternatively, the external device 128 may be programmed to effect and detect the change in the vehicle parameter. For example, the external device 128 may send a signal to the automotive electronics system 110 to trigger the activation of the high beams, and subsequently receive a notification from the automotive electronics system 110 indicating the activation of the high beams. In some implementations, the vehicle parameter may include a specific value associated a vehicle sensor, such as an activation of wiper, the presence of a passenger, or a steering angle of 90 degrees, for example.

After the association (304), the external device 128 may obtain (306) a second input data stream from the unidentified sensor in the vehicle. The second input data stream includes the identifier and a second data pattern associated with the identifier. For example, the external device 128 may obtain (306) a data stream having the identifier of 10101111 and a different 16-bit data pattern of 0000111100001111. When obtaining (306) the second input data stream, the external device 128 may monitor the CAN to look for data bits undergoing the fastest absolute or rate of change.

Next, in some implementations, the external device 128 may associate (308) the change in the vehicle parameter of the vehicle with a change from the first data pattern to the second data pattern. For example, the external device 128 may associate (308) the change in the vehicle parameter (e.g., activation of the high beams) with the change from the first data pattern of 1111000011110000 to the second data pattern of 0000111100001111.

Next, the external device 128 may identify (310) the type associated with the unidentified sensor based on detecting (304) the change in the vehicle parameter. For example, the external device 128 may identify (310) the sensor to be a light sensor based on detecting the activation of the high beams. Once the type of sensor is identified, the external device 128 may store the type with the identifier for future use. Additionally, the external device 128 may transmit the type and the identifier to an external computer.

In certain implementations, the external device 128 may rely on reinforcement learning using reward functions to perform the functions in FIG. 3. For example, the external device 128 may be programmed to monitor the CAN network for changes in data patterns, to effect a change in a vehicle parameter (e.g., activating the windshield wiper, accelerating the vehicle, locking the door), and to detect the change in data pattern in order to identify the types of sensors in the vehicle. These functions may be repeated to improve the accuracy of the identification process. In other examples, a convolutional neural network may be used to train the external device 128. The convolutional neural network may include serially an input layer having one or more input nodes, one or more hidden layer each having one or more hidden nodes, and an output layer having one or more output nodes. Each node in a layer may accept weighted output values from nodes of a previous layer. By adjusting the weight of each input and repeatedly training the external device 128, the external device 128 may be programmed to perform the functions in FIG. 3.

In a non-limiting example of reinforcement learning, a vehicle operator may accept speed data of the vehicle 102 of 0x123 0x00 0x00 0x5C 0x71 0x81 0x76 0x11 0x32, where 0x123 may be the CAN ID for the speed. For a certain time period, the external device 128 may receive a number of such data (e.g. 10 to 100) organized in rows. The label for each row includes speed value of the vehicle 102. During training, the neural network learns the correct pattern that represents the label. Once the label for the speed is trained, other vehicle parameters (with different CAN messages) may be trained. A trained network may be retrained or tuned to increase its accuracy.

Figure 4:
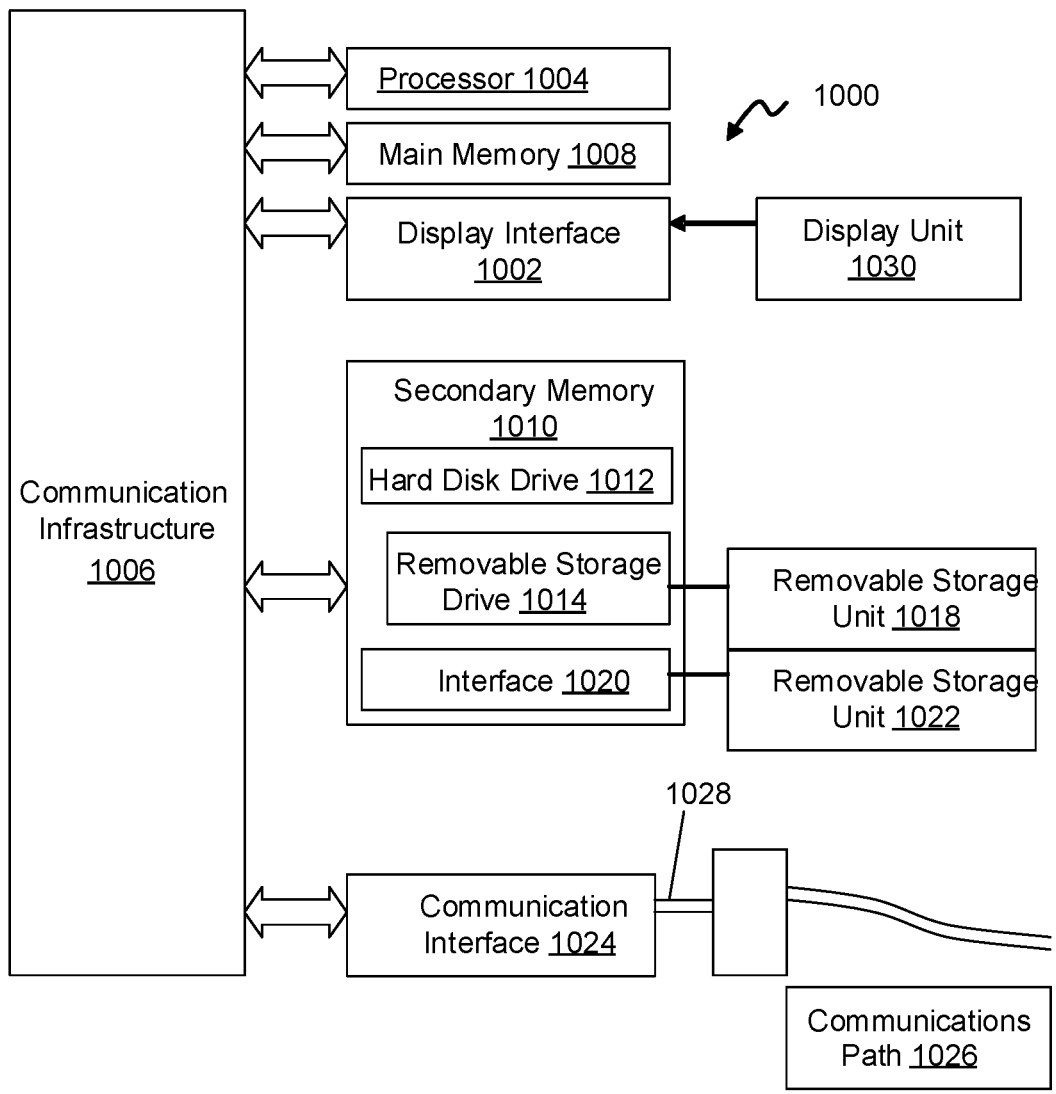
FIG. 4 illustrates an example computer system for an automotive electronic system in accordance with an aspect of the invention.

Aspects of the present invention may be implemented using hardware, software, or a combination thereof and may be implemented in one or more computer systems or other processing systems. In an aspect of the present invention, features are directed toward one or more computer systems capable of carrying out the functionality of the automotive electronic system 110. An example of such a computer system 1000 is shown in FIG. 4.

Computer system 1000 includes one or more processors, such as processor 1004. The processor 1004 is connected to a communication infrastructure 1006 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 1000 may include a display interface 1002 that forwards graphics, text, and other data from the communication infrastructure 1006 (or from a frame buffer not shown) for display on a display unit 1030. Computer system 1000 also includes a main memory 1008, preferably random access memory (RAM), and may also include a secondary memory 1010. The secondary memory 1010 may include, for example, a hard disk drive 1012, and/or a removable storage drive 1014, representing a floppy disk drive, a magnetic tape drive, an optical disk drive, a universal serial bus (USB) flash drive, etc. The removable storage drive 1014 reads from and/or writes to a removable storage unit 1018 in a well-known manner. Removable storage unit 1018 represents a floppy disk, magnetic tape, optical disk, USB flash drive etc., which is read by and written to removable storage drive 1014. As will be appreciated, the removable storage unit 1018 includes a computer usable storage medium having stored therein computer software and/or data.

Alternative aspects of the present invention may include secondary memory 1010 and may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This path 1026 carries signals 1028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1018, a hard disk installed in hard disk drive 1012, and signals 1028. These computer program products provide software to the computer system 1000. Aspects of the present invention are directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features in accordance with aspects of the present invention, as discussed herein. In particular, the computer programs, when executed, enable the processor 1004 to perform the features in accordance with aspects of the present invention. Accordingly, such computer programs represent controllers of the computer system 1000.

Figure 5:
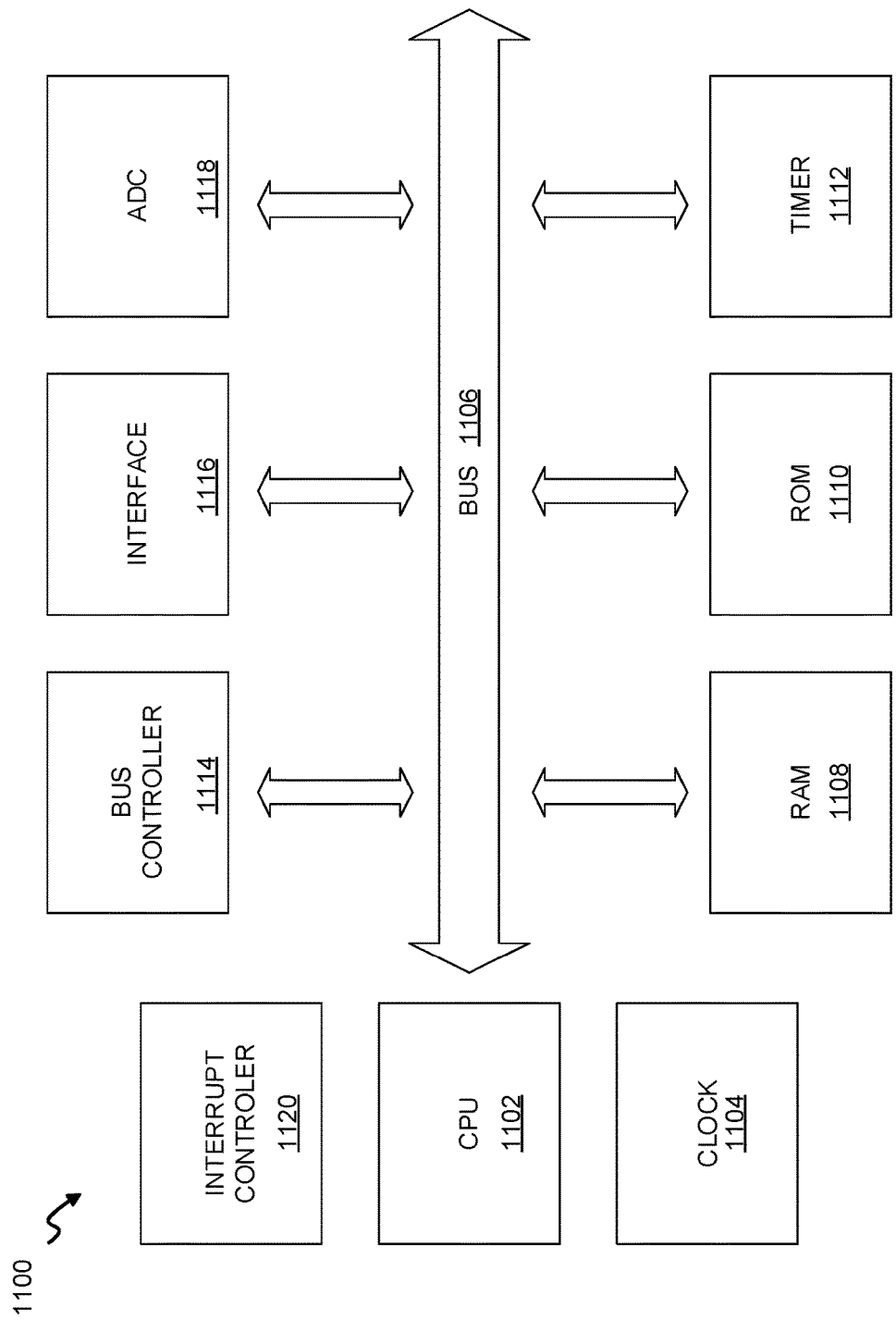
FIG. 5 illustrates an example microcontroller for an external device in accordance with an aspect of the invention.

In an aspect of the present invention where the invention is implemented using software, the software may be stored in a computer program product and loaded into computer system 1000 using removable storage drive 1014, hard drive 1012, or communications interface 1020. The control logic (software), when executed by the processor 1004, causes the processor 1004 to perform the functions described herein. In another aspect of the present invention, the system is implemented primarily in hardware using, for example, hardware components, such as application specific integrated circuits (ASICs). In some implementations, one or more microcontrollers may be implemented in the external device 128 for carrying out features of the present invention. An example of such a microcontroller 1100 is shown in FIG. 5.

The microcontroller 1100 includes a CPU 1102, RAM 1108, ROM 1110, a timer 1112, a BUS controller, an interface 1114, and an analog-to-digital converter (ADC) 1118 interconnected via an on board BUS 1106.

The CPU 1102 may be implemented as one or more single core or multi-core processors, and receive signals from an interrupt controller 1120 and a clock 1104. The clock 1104 sets the operating frequency of the entire microcontroller 1100 and may include one or more crystal oscillators having predetermined frequencies. Alternatively, the clock 1104 may receive an external clock signal. The interrupt controller 1120 may also send interrupt signals to the CPU to suspend CPU operations. The interrupt controller 1120 may transmit an interrupt signal to the CPU when an event requires immediate CPU attention.

The RAM 1108 may include one or more SRAM, DRAM, SDRAM, DDR SDRAM, DRRAM or other suitable volatile memory. The ROM 1110 may include one or more PROM, EPROM, EEPROM, flash memory, or other types of non-volatile memory.

The timer 1112 may keep time and/or calculate the amount of time between events occurring within the microcontroller 1100, count the number of events, and/or generate baud rate for communication transfer. The BUS controller 1114 prioritizes BUS usage within the microcontroller 1100. The ADC 1118 allows the microcontroller 1100 to send out pulses to signal other devices.

The interface 1116 is an input/output device that allows the microcontroller 1100 to exchange information with other devices. In some implementations, the interface 1116 may include one or more parallel port, a serial port, or other computer interfaces.

Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for identifying a type of an unidentified sensor, comprising:
    obtaining a first input data stream from the unidentified sensor in a vehicle, wherein the input data stream includes an identifier representing the unidentified sensor and a first data pattern associated with the identifier;
    detecting a change in a vehicle parameter of the vehicle;
    obtaining a second input data stream from the unidentified sensor in the vehicle, wherein the second input data stream includes the identifier and a second data pattern associated with the identifier, the second data pattern being different from the first data pattern;
    associating the change in the vehicle parameter of the vehicle with a change from the first data pattern to the second data pattern; and
    identifying the type associated with the unidentified sensor based on detecting the change in the vehicle parameter.

2. The method of claim 1, wherein:
    the vehicle parameter includes an indication of a vehicle operation; and
    detecting the change in the vehicle parameter of the vehicle further includes receiving an input from an operator of the vehicle indicating an execution of the vehicle operation.

3. The method of claim 2, wherein the vehicle operation includes at least one of an acceleration, a brake, or a steering.

4. The method of claim 1, wherein the vehicle parameter includes at least one of a speed reading, a rotation-per-minute reading, a steering angle reading, a temperature reading, or a fuel level reading.

5. The method of claim 1, further comprising storing the identifier, the type, and the associated vehicle parameter in a memory.

6. The method of claim 1, transmitting the identifier, the type, and the associated vehicle parameter.

7. The method of claim 1, further comprising, before detecting a change in a vehicle parameter of the vehicle, effecting the change in the vehicle parameter of the vehicle.

8. A dongle, comprising:
    a memory;
    an interface;
    one or more processors configured to:
        obtain a first input data stream from an unidentified sensor in a vehicle through the interface, wherein the input data stream includes an identifier representing the unidentified sensor and a first data pattern associated with the identifier;
        detect a change in a vehicle parameter of the vehicle;
        obtain a second input data stream from the unidentified sensor in the vehicle through the interface, wherein the second input data stream includes the identifier and a second data pattern associated with the identifier, the second data pattern being different from the first data pattern;
associate the change in the vehicle parameter of the vehicle with a change from the first data pattern to the second data pattern; and
identify the type associated with the unidentified sensor based detecting the change in on the vehicle parameter.

9. The dongle of claim 8, wherein:
the vehicle parameter includes an indication of a vehicle operation; and
the one or more processors are further configured to receive an input from an operator of the vehicle indicating an execution of the vehicle operation.

10. The dongle of claim 8, wherein the vehicle operation includes at least one of an acceleration, a brake, or a steering.

11. The dongle of claim 8, wherein the vehicle parameter includes at least one of a speed reading, a rotation-per-minute reading, a steering angle reading, a temperature reading, or a fuel level reading.

12. The dongle of claim 8, further comprising the one or more processors being configured to store the identifier, the type, and the associated vehicle parameter in the memory.

13. The dongle of claim 8, further comprising the one or more processors being configured to transmit the identifier, the type, and the associated vehicle parameter.

14. The dongle of claim 8, wherein the interface is configured to connect to an On-Board Diagnostic interface.

15. A non-transitory computer readable medium having instructions stored therein that, when executed by one or more processors, cause the one or more processors to:
obtain a first input data stream from an unidentified sensor in a vehicle, wherein the input data stream includes an identifier representing the unidentified sensor and a first data pattern associated with the identifier;
detect a change in a vehicle parameter of the vehicle;
obtain a second input data stream from the unidentified sensor in the vehicle, wherein the second input data stream includes the identifier and a second data pattern associated with the identifier, the second data pattern being different from the first data pattern;
associate the change in the vehicle parameter of the vehicle with a change from the first data pattern to the second data pattern; and
identify the type associated with the unidentified sensor based on detecting the change in the vehicle parameter.

16. The computer readable medium of claim 15, wherein:
the vehicle parameter includes an indication of a vehicle operation; and
detecting the change in the vehicle parameter of the vehicle further includes receiving an input from an operator of the vehicle indicating an execution of the vehicle operation.

17. The computer readable medium of claim 16, wherein the vehicle operation includes at, least one of an acceleration, a brake, or a steering.

18. The computer readable medium of claim 15, wherein the vehicle parameter includes at least one of a speed reading, a rotation-per-minute reading, a steering, angle reading, a temperature reading, or a fuel level reading.

19. The computer readable medium of claim 15, further comprising instructions, when executed by the one or more processors, that cause the one or more processors to store the identifier, the type, and the associated vehicle parameter in the memory.

20. The computer readable medium of claim 15, further comprising, instructions, when executed by the one or more processors, that cause the one or more processors to transmit the identifier, the type, and the vehicle parameter.

* * * * *